United States Patent
Sirola et al.

(10) Patent No.: US 7,578,910 B2
(45) Date of Patent: Aug. 25, 2009

(54) DEEP WELL ANODES FOR ELECTRICAL GROUNDING

(75) Inventors: D. Brien Sirola, Barrie (CA); Graham Hagens, Hamilton (CA)

(73) Assignee: SAE Inc., Barrie (CA)

( * ) Notice: Subject to any disclaimer, the term of this patent is extended or adjusted under 35 U.S.C. 154(b) by 375 days.

(21) Appl. No.: 11/783,755

(22) Filed: Apr. 12, 2007

(65) Prior Publication Data

US 2007/0187854 A1 Aug. 16, 2007

Related U.S. Application Data

(63) Continuation-in-part of application No. 11/124,406, filed on May 9, 2005, now abandoned, which is a continuation-in-part of application No. 10/643,149, filed on Aug. 19, 2003, now abandoned.

(60) Provisional application No. 60/404,129, filed on Aug. 19, 2002.

(51) Int. Cl.
C23F 13/16 (2006.01)

(52) U.S. Cl. .............. 204/196.36; 204/196.37; 204/196.21; 204/196.08; 252/500; 252/502

(58) Field of Classification Search .............. 252/500, 252/502; 204/196.36, 196.08, 196.21, 196.37
See application file for complete search history.

(56) References Cited

U.S. PATENT DOCUMENTS

| | | | |
|---|---|---|---|
| 2,495,466 A | 1/1950 | Miller | |
| 2,553,654 A | 5/1951 | Heise | |
| 3,573,427 A | 4/1971 | Minsk | |
| 3,616,354 A * | 10/1971 | Russell | 205/724 |
| 3,725,669 A | 4/1973 | Tatum | |
| 3,725,699 A | 4/1973 | Pascoe | |
| 3,917,781 A | 11/1975 | Gabriel et al. | |
| 3,927,163 A | 12/1975 | Gabriel et al. | |
| 3,941,918 A | 3/1976 | Nigol et al. | |
| 3,962,142 A | 6/1976 | Freeman et al. | |
| 4,017,569 A | 4/1977 | Hass | |
| 4,018,715 A * | 4/1977 | Tatum | 252/510 |
| 4,144,077 A * | 3/1979 | Gallus | 106/669 |
| 4,170,532 A * | 10/1979 | Tatum | 204/196.3 |
| 4,175,021 A * | 11/1979 | Tatum et al. | 204/196.36 |
| 4,400,259 A * | 8/1983 | Schutt | 204/196.33 |
| 4,407,676 A | 10/1983 | Restrepo | |
| 4,414,030 A | 11/1983 | Restrepo | |
| 4,442,903 A * | 4/1984 | Schutt et al. | 166/385 |
| 4,544,464 A | 10/1985 | Bianchi et al. | |
| 4,710,644 A * | 12/1987 | Baach | 204/196.36 |
| 4,786,388 A * | 11/1988 | Tatum, Jr. | 204/196.21 |
| 4,871,395 A | 10/1989 | Sugama | |
| 5,026,468 A * | 6/1991 | Carpenter et al. | 204/196.02 |
| 5,026,508 A * | 6/1991 | Tatum et al. | 204/196.36 |
| 5,040,599 A * | 8/1991 | Pfalser et al. | 166/248 |
| 5,055,166 A | 10/1991 | Schutt | |
| 5,080,773 A * | 1/1992 | Tatum et al. | 204/196.34 |
| 5,139,634 A * | 8/1992 | Carpenter et al. | 205/727 |
| 5,167,710 A | 12/1992 | Leroux et al. | |
| 5,174,871 A * | 12/1992 | Russell | 205/734 |
| 5,207,530 A * | 5/1993 | Brooks et al. | 405/55 |
| 5,254,228 A * | 10/1993 | Westhof et al. | 205/734 |
| 5,294,396 A | 3/1994 | Dressel et al. | |
| 5,370,783 A | 12/1994 | Carlson et al. | |
| 5,413,689 A | 5/1995 | de Nora et al. | |
| 5,447,564 A | 9/1995 | Xie et al. | |
| 5,507,933 A | 4/1996 | de Nora et al. | |
| 5,547,311 A * | 8/1996 | Kenda | 405/52 |
| 5,550,176 A | 8/1996 | Lewis et al. | |
| 5,609,748 A | 3/1997 | Kotowski et al. | |
| 5,908,584 A | 6/1999 | Bennett | |
| 6,022,469 A | 2/2000 | Page | |
| 6,121,543 A | 9/2000 | Hallmark | |
| 6,193,443 B1 | 2/2001 | Trudeau et al. | |
| 6,193,857 B1 | 2/2001 | Davison et al. | |
| 6,303,017 B1 | 10/2001 | Page et al. | |
| 6,821,336 B1 * | 11/2004 | Ramme et al. | 106/709 |
| 7,186,321 B2 * | 3/2007 | Benham | 204/196.36 |
| 2002/0162484 A1 * | 11/2002 | Ramme et al. | 106/705 |
| 2005/0194576 A1 * | 9/2005 | Sirola et al. | 252/500 |

FOREIGN PATENT DOCUMENTS

| | | |
|---|---|---|
| FR | 2216244 | 8/1974 |
| GB | 1424162 | 2/1976 |

OTHER PUBLICATIONS

U.S. Appl. No. 11/124,243, filed May 9, 2005.

* cited by examiner

Primary Examiner—Bruce F Bell
(74) Attorney, Agent, or Firm—Dinesh Agarwal, P.C.

(57) ABSTRACT

Improved deep well grounding systems of the kind used for cathodic protection of ground installations according to the invention employ a combination of materials for the casing of the central metallic anode and the backfill in the well which exhibit a degree of permeability sufficient to allow by-product gases develop in ordinary use of this system to escape, avoiding unwanted cavitation, while minimizing the migration of ground water and the attendant undesirable environmental pollution.

15 Claims, No Drawings

DEEP WELL ANODES FOR ELECTRICAL GROUNDING

RELATED APPLICATION

This application is a continuation-in-part of U.S. patent application Ser. No. 11/124,406 filed May 9, 2005 now abandoned and entitled DEEP WELL ANODES FOR ELECTRICAL GROUNDING, which in turn is a continuation-in-part of U.S. patent application Ser. No. 10/643,149 filed on Aug. 19, 2003 now abandoned and entitled CONDUCTIVE CONCRETE COMPOSITIONS AND METHODS OF MANUFACTURING SAME, which claims priority based on U.S. provisional patent application No. 60/404,129, filed on Aug. 19, 2002, all of which are hereby incorporated herein in their entirety, by reference.

BACKGROUND OF THE INVENTION

Electrical Grounding Techniques

Various electrical grounding techniques are utilized throughout the world for the prevention of electrical damage to buildings and equipment. Such grounding techniques find numerous applications in such diversified areas as power and telecommunication systems, electronic equipment, fuel storage tanks, industrial installations, commercial and residential buildings as well as buried equipment such as pipelines. Two distinct types of grounding techniques are commonly employed. The first involves the protection of personnel, buildings or equipment from any of a number of rapid and/or intense electrical hazards, such as a lightning strike. The second technique, known as "cathodic protection" employs activated grounding to reduce the slow degradation of metallic installations by electrochemical corrosion.

The established grounding techniques commonly involve the use of wires or rods of copper or other electrically conductive metals being attached to the installation requiring protection, after which the metallic rod or conductor is buried in a narrow trench or driven into the earth. In the cathodic protection technique, an electrical circuit is established such that a direct electrical current flows into buried electrodes. The electrical circuit is designed such that the metallic structures (such as pipes etc.) which require protection become the cathode, while the conductive material which forms the anodes is imbedded in the earth some distance away.

The art of electrical grounding may also be conveniently divided into two classes: "shallow trench" and "deep well" applications, with the latter technology being primarily used for cathodic protection. This shallow trench grounding method is described in greater detail in our co-pending U.S. patent application Ser. No. 11/124,243 filed May 9, 2005, the entire disclosure of which is incorporated herein by reference, as are the disclosures of the prior U.S. patents of others specifically identified in the present specification.

One particularly valuable material used in both shallow and deep well applications consists of various forms of carbon. Carbon is allotropic and is found widely in its crystalline and amorphous forms. It is found in coke in its amorphous form, while graphite and diamond provide examples of the crystalline form. Graphite, carbon black and coke breeze are all allotropes of carbon that conduct electricity, "breeze" being defined as small cinders or spherical particles which are formed as a by-product of the processing of coal or petroleum.

While such forms of carbon are sometimes used in shallow trench and deep well applications as backfill material without further processing, it is also known to modify carbon by means of various cementitious materials to improve its strength and structural integrity. The various types of materials which have been used to improve the properties of the carbon include hydraulic cements such as Portland cement, blast furnace slag, fly ash etc. Concrete and other cementitious compositions are normally prepared by mixing required amounts of hydraulic cement with fine and coarse aggregates and other additives known to the art, with required amounts of water. The terms 'paste', 'mortar', slurry and 'concrete' are used in the art: pastes are mixtures composed of an hydraulic cement binder, usually, but not exclusively Portland cement, which itself is a mixture of calcium, aluminum and ferrous silicates.

In the conductive concretes relevant to the present invention, the sand, stones and other minerals normally employed as aggregate are replaced by carbon in one of its forms. Optionally the various forms of carbon can be admixed with the aggregates and other additives commonly known in the art, provided that the concentration of carbonaceous material is sufficient to impart the necessary electrical conductivity. Such carbonaceous cements may be formed in place, or attached to the electrodes in the deep well cathodic process.

U.S. Pat. No. 6,121,543 (Hallmark) describes a groundbed electrode comprising a horizontally-oriented copper, or other electrically-conductive metal conductor, embedded in a cementitious sheath containing approximately equal parts of Portland cement and powdered crystalline carbon. The cementitious sheath may contain from approximately from 45 parts to 55 parts crystalline carbon powder, with the balance being Portland cement.

U.S. Pat. No. 3,941,918 (Nigol) discloses a conductive cement for use with electrical insulators in which graphite fibers are used to form a conducting network within a combination of Portland cement, graphite fibers and high structure carbon black to provide an electrically conductive cement with high compressive strength. Related applications of carbonaceous materials in a concrete matrix for use on various surfaces walkways, floors roadways and the like are described in U.S. Pat. Nos. 3,573,427 and 3,962,142, while U.S. Pat. No. 5,908,584 (Bennett) has described an electrically conductive building material comprising a mixture of graphite, amorphous carbon, sand, and a cement binder to shield building materials against electromagnetic radiation.

Deep Well Grounding Technique for Cathodic Protection

Deep well beds provide an effective method of increasing the life of subsurface metallic structures and the use of metallic anodes in combination with various carbon and graphite electrodes is now widespread. In this procedure the cost of electrode replacement is an important consideration, the rate of anodic consumption being dependent on the current density at the interface of the anode and soil medium. It has been found that a more uniform flow of current can be achieved if the anode is completely surrounded by a uniformly conductive carbonaceous backfill material.

According to the deep well technique a hole is drilled in the soil near the structure to be protected to an approximate depth of 150 to 450 feet, with a diameter of six or more inches. Typically the central anodes are composed of expensive materials such as mixed metal oxides or silicon-iron alloys, and under normal working conditions they may last from 5 to 10 years before suffering erosive failure. An anodic chain is then lowered into this hole and the hole is then filled with the backfill material, either in the dry form or optionally as an aqueous slurry.

It is well known to those skilled in the art that appropriate use of a suitable carbonaceous backfill material can double the lifetime of the system. The mechanism by which this is accomplished involves the sacrificial oxidation of the carbon in the backfill by the electrical current in preference to the central anode. The rate of loss of the carbon can be quantitatively estimated from known rate of oxidation during the electrolytic process.

Existing procedures for deep well electrical grounding, as described above, suffer from a number of shortcomings, one of the most serious being environmental contamination. An unavoidable by-product of the electrolytic reaction is the generation of gas, since, under the moist conditions commonly present in a deep well environment, the passage of one joule of electrical current results in the formation of one mole of gas. The most prevalent gas formed at the anode is oxygen, but if chlorides are present in the ground water, highly corrosive chlorine is also generated. If these gases are not able to escape from the system, cavitation and ultimately interruption of the circuit can result.

It is therefore important that the construction of a deep well anode be such that the anodic gases are able to escape. This is usually accomplished by utilizing a conductive backfill material to close the gap between the anode and the wall of the well. Utilization of backfill also allows the dimension of the hole to be large enough for easy emplacement of the central anode. There is however a serious problem associated with this common practice. Since coke breeze is very permeable to water, as well as to the anodic gases, its presence in deep well installations results in large quantities of water migrating between geological layers with unacceptable environmental consequences.

The high water permeability of coke breeze is of such concern that legislation in various States to ban the use of this material for this application is either pending or has already been enacted. It is therefore essential that any material used for backfill purposes have both acceptable impermeability to water and the requisite degree of electrical conductivity.

In recent years various disclosures have attempted to solve the problem associated with the vertical migration of ground water in deep well installations. One approach has involved covering the central metallic anode with some kind of sheathing material, or for example, by use of pre-packaged anodes emplaced in special containers or rigid cartridges (U.S. Pat. Nos. 3,725,699 and 4,400,259), or a more flexible construction which retains its shape and is thus more readily transported and installed. (U.S. Pat. No. 4,544,464 (Bianchi) uses a perforated disk filled with coke, to facilitate the flow of electric current between the central anode and the external casing, and backfill, composed of graphite and coke such that the anode is homogeneously surrounded by backfill in order to provide consistent current flow as the corrosion continues.

U.S. Pat. No. 4,786,388 (Tatum) discloses a low resistance non-permeable backfill for cathodic protection of subsurface metallic structures consisting of a mixture of carbonaceous materials, lubricants, Portland cement and water. In that process the slurry is pumped into an anode bed. To this end Tatum describes a method of pumping an electrically conductive cementitious backfill into the well in such a way as to produce a groundbed construction with a non-permeable concrete annulus in contact with the earthen bore, an improvement is said to avoid water quality degradation while at the same time achieving a low resistance ground contact.

U.S. Pat. No. 5,080,773 (Tatum) describes an electrical ground installed in the earth comprising an electrical conductor, a bore hole and a conductive non-porous carbonaceous cement composition surrounding said conductor and in contact with said rod by means of earth. These compositions are said to have enhanced conductivity, decreased porosity and a rate of set similar to that of conventional concrete.

"Watertightness" in the present context refers to the ability of a cementitious material such as concrete to hold back or retain water without visible leakage under given conditions of use or testing. "Permeability" refers to the amount of water migration through a material substance when the water is under pressure and is quantitatively determined according to ASTM D5084. The two properties are closely related, and both are conventionally measured in units of cm/sec, but will generally not be numerically identical because of differences between the prevailing conditions of use and the ASTM D5084 test conditions When a mature good quality concrete is tested for permeability according to ASTM D5084 in which the length of sample is 4" and the water pressure is 20 psi, the measured permeability is approximately $1 \times 10^{-10}$ cm per second (reference: S. H. Kosmatka et al. 1995. *Design and Control of Concrete Mixtures* Ottawa: Canadian Portland Cement Association, pp. 8-9). For use in a cathode protection system, such a low degree of permeability does prevent the vertical transmission of ground water, but gases are also substantially prevented from escaping creating problems at cavitation, etc. referred to earlier. Such materials will hereinafter be referred to as "impermeable". By contrast, with a permeability of about 0.05 cm/second, coke breeze backfill not only allows gases to escape but permits vertical migration of groundwater vertically through the system. A third example is bentonite which is regarded as a watertight product and exhibits a permeability of $10^{-7}$ cm/sec.

Although various conductive sheath compositions consisting of carbon in combination with cementitious binders have been directed to the problem of vertical water flow between aquifers, none has yet proved to be technically or economically suitable. One significant problem is the high cost of manufacture and installation. More importantly, none of these known systems provides a composition or method which simultaneously allows the gases to safely escape, while preventing the ground water from migrating. Porous carbonaceous backfill such as coke breeze is still widely used in deep well cathodic systems, however, problems arising from the vertical transmission of groundwater have become so serious that consideration is being given to banning the procedure.

In short, there has not been available to date any simple and inexpensive method for controlling the relative permeability of water and gases in deep well anodic installations.

SUMMARY OF THE INVENTION

It is a principal objective of the present invention to provide a deep well anode for electrical grounding in which the central metallic anode is encased and protected by a cementitious sheath and by a backfill which cooperatively produce a degree of permeability that allows by-product gases developed in use to escape at a rate that permits long-term operation of a cathodic protection system, while minimizing the migration of groundwater.

It is a further objective of the present invention to provide a deep well anode for electrical grounding as aforesaid which exhibits the following attributes:

(i) a level of electrical conductivity affording the desired cathodic protection;

(ii) sufficient physical strength to withstand placement down a well and the pressures encountered by the deep well anode in the course of its useful lifetime;

(iii) performance of the deep well anode under a wide range of current densities and rates of gas evolution;
(iv) resistance to any corrosive gases encountered in ordinary use;
(v) costs of manufacture and use competitive with that of existing deep well anode electrical grounding systems; and
(vi) significantly reduced objective environmental impact relative to conventional deep well cathodic systems.

With a view to achieving these objectives and overcoming the aforementioned disadvantages of known deep well anodic installations discussed above, the present invention provides a first conductive composition for forming the sheath of a metal conductive anode for use in a deep well grounding system of the kind which includes an anode lowered into a bore hole which is subsequently backfilled for cathodic protection and a second conductive composition for use as the backfill material in the deep well grounding system, the relative permeabilities of the first and second conductive compositions being such that the grounding system allows free venting of by-product gases generated during operation of the system, while limiting undesired migration of ground water.

According to a first embodiment, the invention provides carbonaceous cementitious materials for forming a sheath for the central metallic anode in a deep well anode system characterized by:
(a) sufficient electrical conductivity to afford the desired cathodic protection;
(b) a degree of permeability which permits by-product gases to migrate away from the anode for absorption by the soil surrounding the well and/or up to the well surface where the by-product gases may be dispersed; and
(c) sufficient strength and structural integrity to provide mechanical protection for expensive and fragile mixed metal oxide anodes, both in introducing the anode into the deep well and in operation of the deep well anode system over time.

Preferred cementitious anode sheathing materials in this first embodiment of the invention are conductive cement compositions comprising Type 10 Portland cement at a concentration of 20 to 60% by weight and from 80 to 40% of carbon having particle sizes between 50 and 150 mesh, and exhibiting a permeability between $10^{-6}$ and $10^{-8}$ cm/sec. The carbon additive can be, for example, coke dust or carbon black. Alternatively or in addition to finely divided carbon, a number of other materials may be used to reduce the permeability of the cement to the desired level.

According to a second embodiment of the invention, the central metallic anode is encased in an impermeable conductive sheath, but a conductive backfill material is provided which possesses the required degree of permeability to allow the bi-product gases to migrate to the surrounding soil or the surface of the well, while minimizing or eliminating the vertical flow of ground water.

Preferred backfill materials in this second embodiment of the invention are conductive siliceous cement compositions of the kind used to prepare the sheath for the central metallic anode in the first embodiment as described above or compositions of a flowable granulated carbon admixed with a selected amount of Type F fly ash to adjust the water permeability of the backfill.

Compositions according to the invention include carbonaceous cements in which the permeability of the composition is brought down to the desired level by the incorporation of small quantities of alkali soaps of oleic acid, stearic acid or distilled tall oil and mixtures thereof.

With the novel anode sheathing and backfill materials of the invention, the installation in a deep well grounding system and use are substantially the same as for conductive materials already known to those skilled in the art of cathodic protection and referred to above.

Carbonaceous concrete sheathing compositions of this general kind may be mixed with water and the resulting slurry pumped or poured into the well, or else pre-cast in an offsite operation, using techniques and procedures known in the art of pre-cast concrete manufacturing, then placed within the well in a second step. If the latter, two-step procedure is followed, any gap between the sheath and the outer wall filled in with backfill. In this process the backfill is prepared as a slurry above ground and pumped into the deep well after placement of the central anode and sheath. The product then cures to the desired final properties in situ over the course of several days.

The first and second embodiments of the invention are by no means mutually exclusive. The relative roles played by the conductive anode sheath composition and the conductive backfill composition are complementary in attaining the desired operating characteristics, in particular the overall level of permeability of the system of the deep well grounding system. Thus, it is possible to combine the first and second embodiments of the invention by using a conductive cement together with a backfill material, both of which are permeable to by-product gases, but substantially watertight.

The Portland Cement based carbonaceous compositions described above may be specifically modified to withstand and function in particular soil conditions. Owing to the facts (i) that Portland Cement has a high concentration (60-70%) of CaO and (ii) that these compositions require a certain quantity of internal water to conduct electricity, problems in effective operation may arise in sections of the well which are so dry that there is insufficient moisture to allow the material to conduct an electrical current.

Another local environmental situation which can impair the operation of deep well anode systems using Portland cement based carbonaceous compositions arises where the ground water contains high levels of sodium chloride brine. This presents the risk that chlorine gas generated during the electrolytic process might dissolve excess quantities of the calcium in the cement, thereby weakening the structure and increasing its permeability to water to an unacceptable level.

To address these different soil chemistries or environments, both the sheath surrounding the central anode and the backfill material can be composed of a granular electrically conductive form of carbon, compounded with a binding/sealing agent that contains low levels of calcium oxide. The two compositions need not be the same, and are selected to suit the actual conditions. Such sheathing and backfill materials are sufficiently conductive in dry situations and less sensitive to calcium loss when exposed to saline conditions.

DETAILED DESCRIPTION OF PREFERRED EMBODIMENTS

Deep Well Anodes with Conductive Cement Casing Permeable to Gases.

All embodiments of this invention take advantage of the discovery of a series of compositions with desirable permeability properties that are capable of being formed into a conductive sheath around the central anode. The compositions are such that permeability of the system can be adjusted as required so that the by-product gases are allowed to migrate to surrounding soil in the wells, or to the surface of the well, while vertical flow of the groundwater is minimized or eliminated. This process is now believed to be practicable owing to the fact that when a carbonaceous cementitious sheath is employed, the by-product gases form on the surface of the individual carbon particles which are an integral part of that composition. They are therefore generated at sufficient distance from each other that the build up is widely distributed, such that a suitably designed material will allow the gases to escape.

It will be appreciated that because of the many different variables encountered in the field no single composition according to the invention will meet the requirements of the many different deep well applications used today. This is because the quantity of gas produced, and the rate of migration of the water depends on many different factors such as current density, depth of the anode, conditions of the water table etc. Thus although a number of compositions which provide this result are here described as different examples, these are not to be considered as limiting the invention. In the course of this research a large number of promising avenues were explored before being abandoned.

We discovered that the requirements described above may be obtained by means of carbonaceous concretes of which several ranges of composition are here described. Permeability appears to be a function of a number of factors including the type of cement, type of carbon, and utilization of different additives, and so it can be reduced by utilizing finely divided carbon, such as coke dust or carbon black, or by higher concentrations of Portland cement. Very low permeability can also be attained by cross-linking soluble alkali silicates with suitable di- or tri-valent metal such as calcium, zinc or aluminum. Another important aspect of this invention is the discovery that the permeability of Portland cement based compositions can be significantly reduced by incorporation of the alkali metal soaps of long chain fatty acids.

The preferred concentration of cement and carbon to be used in the Portland based compositions is determined by a number of constraints which are set by the performance requirements. Optimum properties are obtained if Type 10 Portland cement is used between a concentration of 20 to 60% by weight, and from 80 to 40% of carbon having a particle size between about 50 and 150 mesh. If less than about 20% cement is used, the composition has unacceptable strength, as an anode sheathing material, whereas if less than 40% carbon is employed the final product has insufficient electrical conductivity.

The preferred permeability is believed to be between about $10^{-6}$ and $10^{-8}$ cm/sec. The preferred strength is greater than about 300 pounds per square inch (psi). The variation in strength, permeability and conductivity of some typical compositions are provided in the Examples. The application here described is, however, not limited to the ingredients shown in the examples, because it is anticipated that various additives known to those skilled in the art of Portland cement based concrete may also be used in this system. Thus it is anticipated that similar results might be obtained if such well known additional materials as blast furnace slag, fly ash, silica fume, aggregates, water reducing superplasticizers, accelerators, retarders, defoamers or air entraining agents could all be employed in these systems. In addition under certain circumstances it might be deemed valuable to partially or completely replace the Type 10 Portland cement by other grades such as Type 30 or S.

Certain additives not previously known for use in this application have been found to be particularly useful for modifying the permeability of these systems. It is known that waterproof Portland cement based concrete can be manufactured by means of addition of small quantities of the calcium or aluminum soaps of long chain organic compounds such as stearic or oleic acids, esters such as butyl stearate, and such proprietary formulations such as those containing silicones. Our research determined that most of these known cement waterproofing agents are of marginal usefulness when dealing with carbonaceous cements. This is likely due to the fact that the carbon particles are so porous as to render these additives generally ineffective.

Surprisingly, it was found that the soluble alkali metal soaps of long chain fatty acids are efficacious in modifying the permeability of the carbonaceous cements here described. The permeability of the carbonaceous concrete may be greatly reduced if a fatty acid was introduced to the uncured composition in the form of its soluble alkaline soap. Although the specific mechanism giving rise to these results is not fully understood, it is conjectured that these soluble soaps react with the lime produced during the cement curing process so as to form a uniform dispersion of water insoluble calcium soaps. We discovered that the alkali soaps of both oleic and stearic acid and distilled tall oil, are all effective in this process, and it may reasonably be expected that numerous other fatty acids might also be so employed. As illustrated in the examples, the reduction in permeability is directly proportional to the concentration of soap, up to an 80% reduction being realized. Since this reduction in permeability does not totally prevent the migration of gases through the composition, it is thus possible to control the permeability of water and gas by manipulation of the quantity of fatty acid soap which is added.

From this description of the process it will be evident that the semi-permeable compositions here described may be utilized either as a protective sheath or as an advantageous semi-permeable conductive backfill. Optionally a metallic central anode may be protected with the pre-cast conductive sheath which after a sufficient curing time, may be placed in the well, such process providing protection and optimal positioning of the metallic anode in the centre of the well. After this installation, the remaining void in the well may be filled with a slurry of the same composition in water which is then allowed to cure in situ. It will however also be appreciated that the composition of the anodic sheath and the backfill composition need not be identical, and indeed as will be described below, situations do exist where it is desirable that the composition of the anodic sheath and the backfill material differ from each other.

The examples given below are meant to illustrate the discovery which is embodied by the present invention namely, that by correct choice of the sheathing and backfill material it is possible to design a deep well anodic system which will allow the gases to escape, while greatly reducing the migration of the ground water. As will be appreciated, the compositions described above can be used both for the manufacture of a protective sheath and of a backfill composition as required. As illustrated in Example 8 below, such performance has now been demonstrated in a field installation that has been in continuous operation for a period of three years.

Deep Well Anodes Encased in Impermeable Conductive Cement

The second embodiment describes utilization of a substantially impermeable conductive cement in combination with a semi-permeable conductive backfill material permeable to gases but not groundwater. This aspect of the invention functions substantially from the previous embodiment, in that the electrochemical reactions take place at the surface of the conductive sheath, and in the volume occupied by the backfill material, whereas in the first embodiment the by-product gases formed within the semi-permeable conductive cement.

The advantage of this second approach is that the sheath completely prevents migration of water, and is very much less expensive than the central anode. Another possible advantage is that the compositions disclosed in this embodiment are more resistant to corrosive gases such as chlorine or hydrochloric acid, which may form in certain saline ground waters. As is well known, concrete derived from Portland cement can be corroded by such acids. It will be appreciated that because the sheaths in this embodiment are essentially impermeable to both gases and water, it is necessary to combine them with a backfill material which itself is -permeable to gases, to permit the free flow of by-product gases, while eliminating the migration of groundwater.

It was found that an impermeable, conducting sheath suitable for this embodiment of this invention can be prepared by binding carbon with different types of water resistant binders other than Portland cement. Indeed, Portland cement was found to be unsuitable for this application because the water resistant additives described in the first embodiment do not sufficiently reduce the flow of water to prevent acidolysis of the cement by high salinity groundwater. This goal can be achieved with various types of thermosetting binding agents widely used as industrial grouts and adhesives such as urethanes, urea-or melamine-formaldehyde resins, epoxies and the like. While such products were investigated in the course of this research, all were rejected either because they were considered too expensive for this application, or because of difficulties involved in their utilization, or concerns about environmental leaching. Hot melt adhesives based on such thermoplastic polymers as polyolefins, asphalts and the like were similarly considered and eliminated, both for reasons of cost and difficulty of production.

Novel compositions discovered to be of particular value were formulated by combining particulate carbon with various combinations of long chain fatty acids and metallic cross linking agents such as the oxides or hydroxides or silicates of di- or tri-valent metals. As illustrated in the Examples, we have found that compositions with acceptable electrical conductivity in the absence of water and physical properties suitable for downhole pre-cast may be prepared by admixing between 50 and 90% carbon with 10-40% long chain fatty acid and 1-10% metal oxide or hydroxide and/or from 1-10% by weight of Portland Cement (consisting primarily of tri-calcium silicates). The preferred carbon is coke breeze with a particle size of 30-70 mesh, the preferred fatty acids consist of distilled tall oil or crude tall oil, and the preferred metallic crosslinking agent is calcium oxide, either in the anhydrous form (quicklime) or as the hydrate (slaked lime). Formulations so prepared are suitable for manufacturing pre-cast anodes for placement in the well. However the high viscosity of these mixes makes them unsuitable for use as backfill material.

For soil conditions requiring low calcium levels, we have developed conductive materials which are both electrically conductive and of sufficiently low viscosity for use as a backfill material by admixing combinations of particulate carbon with various combinations of long chain fatty acids and metallic crosslinking agents with a small amount of water. The physical properties suitable for down hole back fill utilization, may be prepared by admixing 100 parts of a composition containing between 50-90% carbon, 10-40% long chain fatty acid and 1-10% metal oxide, hydroxide or silicate, with 30-50 parts water. The preferred carbon is coke breeze with a particle size of 30-70 mesh, and the preferred fatty acids consist of distilled tall oil or crude tall oil, and the preferred metallic cross-linking agent is Type 10 Portland Cement.

EXAMPLES

Example 1

Permeability and Strength of Various Carbonaceous Cement Compositions

To obtain these results carbon and cement of a combined weight of 200 grams were dry blended and sufficient water admixed to obtain a smooth paste. This paste was then packed into standard 2"×4" test cylinders. The different compositions were allowed to cure under moist conditions for 28 days after which they were removed and tested. The table below illustrates some typical results that may be obtained by using various types and ratios of carbon with siliceous cements. The strength shown refers to compressive crush in lbs per square inch (psi). Water tightness was determined by immersing the samples in cold water and measuring the weight increase. These particular examples were obtained using two grades of coke breeze supplied by Hickman Williams, Canada in which the particle size distribution varied from 100 to 30 mesh. The siliceous cement used in these examples was Type 10 Portland (Large, Woodstock Ontario Canada). As shown in Table 1 the water tightness (expressed as the rate of penetration in cm/second), product strength and electrical are directly related to the ratio of cement to coke breeze. On the basis of these results it is concluded that the optimal ratio of cement to carbon is between 60/35 and 20/80. Below about 20% cement binder the compositions have insufficient strength, while above about 65% the electrical conductivity is inadequate. As shown however, within these limits a wide range of permeability to water may be obtained.

TABLE 1

| Test # | Carbon Mesh | Carbon % w/w | Cement % w/w | Strength psi | Water tightness ($10^{-4}$ cm/sec*) |
|---|---|---|---|---|---|
| 1 | 100 | 30 | 70 | 3100 | 2.0 |
| 2 | 100 | 50 | 50 | 2820 | 2.6 |
| 3 | 100 | 60 | 40 | 1440 | 4.3 |
| 4 | 100 | 70 | 30 | 1130 | 5.7 |
| 5 | 50 | 30 | 70 | 3200 | 3.3 |
| 6 | 50 | 50 | 50 | 2870 | 5.0 |
| 7 | 50 | 60 | 40 | 900 | 10.6 |
| 8 | 50 | 70 | 30 | 670 | 14.4 |

*Note:
Because of differences test conditions, the values of the water tightness given in Table 1 differ from permeability as defined by ASTM D5084. A correlation factor of about $7.1 \times 10^2$ is however believed to exist, and when tested according to ASTM D5084 Test sample # 2 yielded a permeability of $3.8 \times 10^{-7}$ cm/sec.

Example 2

Conductivity and Electrolysis of Various Carbonaceous Cement Compositions

Cement compositions prepared and compacted into a 2"×4" test cylinder as described in Example 1. A seven-strand, 8 gauge copper wire was then positioned in the centre of the cylinder such that the lower end of the wire was 1" from the bottom of the cements, and held in that position until the samples were hard. In each case the upper exposed portion of the wire was then coated with a water resistant rubber composition, and after curing for 28 days, each sample was placed within a 5 liter container containing a solution of 1% sodium sulfate. An electrical circuit was then completed by using a Topward Model 3306 variable current power supply, in such a manner that the test sample was the anode, and a 24"×½" steel rod was the cathode. Sufficient voltage was then applied such that a direct current of 0.5 amps would flow through the circuit. It was found that suitable current could be generated with all samples containing more than about 40% by weight of carbon, but below this level the electrical resistance was unacceptably high. The current was allowed to flow and results observed. As set forth in Table 2 below.

TABLE 2

| Carbon Mesh | Carbon % w/w | Cement % w/w | Resistance Ω | Observations |
|---|---|---|---|---|
| 100 | 30 | 70 | >100 | n/a |
| 100 | 50 | 50 | 20 | Gas forming within sample |
| 100 | 60 | 40 | 7 | Gas forming within sample |
| 100 | 70 | 30 | 6 | Gas forming within sample |
| 50 | 30 | 70 | >100 | n/a |
| 50 | 50 | 50 | 30 | Gas forming within sample |
| 50 | 60 | 40 | 10 | Gas forming within sample |
| 50 | 70 | 30 | 5 | Gas forming near wire |

Example 3

Water Tightness, Conductivity and Strength of Various Compositions of Semi-Permeable Carbonaceous Concrete Modified with Fatty Acid Additives to Improve Water Resistance In this experiment samples were prepared and cured as described above for 28 days. The results shown here were obtained using the sodium soaps of Pamak C4 [trademark], a distilled tall oil fraction manufactured by Hercules Canada (Burlington, Ontario). In this experiment a 25% solution of soap was admixed with the water used to prepare different slurries of the carbonaceous cement. These were then transferred to standard 2"×4" cylinders for curing. The test cylinders were then removed from the moulds, dried under ambient conditions for 7 days and weighted. Each was then immersed from water for four hours after which it was removed from the water, dried with a paper towel and weighted again. The results tabulated below show the increase in weight due to absorption of water for samples containing different quantities of soap. In each case the soap content is expressed on a dry basis. The results demonstrate that the uptake of water is inversely proportional to the concentration of soap in the concrete.

TABLE 3

| Soap content (% w/w dry basis) | Weight increase % w/w | Reduction % |
|---|---|---|
| 0.0 | 20.0 | 0.0 |
| 0.5 | 11.0 | 45.0 |
| 1.0 | 10.0 | 50.0 |
| 4.0 | 4.0 | 80.0 |

Example 4

Laboratory Preparations with Low Calcium Cements

To 210 grams (70% w/w) petroleum coke breeze was added 30.0 grams (10% w/w) slaked lime and the two powders were mixed well at room temperature. To this mixture was added 60 grams (20% w/w) distilled tall oil, and the components were mixed well. The resulting paste was compressed into a 2"×4" cylinder and allowed to cure for 48 hours. After removal from the cylinder the product was tested for electrical conductivity, water absorption and compressive strength. The resistance of the cylinder was 150 Ω, and the compressive strength was 300 psi. The water permeability as determined by ASTM D5084 was found to be $2.29 \times 10^{-7}$ cm/sec.

Different variations of this formula were then prepared using various long chain fatty acids, and the oxides and hydroxides of the Group IIA alkali earth metals magnesium and calcium, as well as, zinc and aluminum. As illustrated below the best strength results were obtained with either calcium oxide (quicklime) or slaked lime in the range of 3 to 6% by weight. Although acceptable results were obtained with various long chain fatty acids, for reason of cost the preferred acids derive from crude or distilled tall oil fractions. Of the various types of carbon that were used, the best mixing properties were obtained using petroleum coke breeze such as Loresco Type SC-3 which are typically used as deep well backfill. These materials have a particle size larger than 100 mesh and spherical particles. As illustrated in the Table below, the optimum concentration range of coke breeze is between about 50 and 80%, beyond which range the conductivity is either poor or the mix is difficult to work. The examples shown below were prepared using a distilled tall oil containing 4% resin acids purchased from Hercules Chemicals under the trade name Pamak C4. As illustrated here the preferred range of fatty acid concentration is between about 15 and 30% w/w. The preferred metal oxide cross-linking agents are quicklime or slaked lime between the range of about 3 and 10% w/w.

TABLE 4

| Test # | Metal Oxide | Carbon % w/w | Oxide % w/w | Fatty Acid, % | Strength psi | Resistance Ω |
|---|---|---|---|---|---|---|
| 1 | CaO | 50.0 | 8.0 | 42.0 | <100 | >1000 |
| 2 | Ca(OH)$_2$ | 50.0 | 10.0 | 40.0 | <100 | >1000 |
| 3 | CaO | 60 | 3.0 | 37.0 | 150 | 200 |
| 4 | Ca(OH)$_2$ | 60 | 4.0 | 36.0 | 150 | 200 |
| 5 | CaO | 60 | 8.0 | 32.0 | 300 | 200 |
| 6 | Ca(OH)$_2$ | 60 | 10.0 | 30.0 | 300 | 200 |
| 7 | CaO | 70 | 7.0 | 23.0 | 275 | 150 |
| 8 | Ca(OH)$_2$ | 70 | 10.0 | 20.0 | 275 | 150 |
| 9 | CaO | 85 | 3.0 | 12.0 | <100 | >1000 |
| 10 | Ca(OH)$_2$ | 85 | 5.0 | 10.0 | <100 | >1000 |
| 11 | MgO | 70 | 5.0 | 25.0 | <100 | n/a |
| 12 | Mg(OH)$_2$ | 70 | 6.0 | 25.0 | <100 | n/a |
| 13 | ZnO | 70 | 5.0 | 25.0 | <100 | n/a |

Example 5

Further Laboratory Preparations with Low Calcium Cements

As illustrated in the test samples shown in the Table below, valuable compositions may also be prepared by blending petroleum coke breeze with various combinations of Portland cement, alkali earth metal oxides, alkaline hydroxides, tall oil fatty acids and water. Such materials may either be precast or discharged into the deep well using a pump as described above.

TABLE 5

| Ingredient | Test #1 Parts w/w | Test #2 Parts w/w | Test #3 Parts w/w | Test #4 Parts w/w | Test #5 Parts w/w |
|---|---|---|---|---|---|
| Carbon | 65 | 65 | 65 | 70 | 70 |
| Cement | 10 | 20 | 24 | 12 | — |
| Tall oil | 25 | 15 | 10 | 15 | 25 |
| Ca(OH)$_2$ | — | — | — | 2.0 | 4 |
| NaOH | — | — | 1 | 1.0 | 3 |
| Water | 20 | 40 | 40 | 40 | 40 |
| Results | | | | | |
| Resistance, Ω | <20 | >1000 | <20 | <20 | <20 |
| Strength, psi | 600 | 200 | 600 | 200 | 600 |
| Fluidity | good | Poor | excellent | Excellent | excellent |

Example 6

Laboratory Electrolysis of Low Calcium Cements

The composition described in Example 4, Test #4, was prepared and set aside. A 7 strand, 8 gauge copper wire 6" in length was positioned vertically in 2"×4" plastic forming cylinder such that the wire was in the centre of the cylinder, with the lower end 1" above the bottom of the cylinder. The composition was then compacted around the wire and allowed to cure for 48 hours. The sample was then removed from the plastic form and the copper wire protruding from the top of the formed cylinder was coated with a water resistant silicone grout and allowed to cure for 24 hours. This test cylinder was then positioned in a 5 gallon container filled with water containing 0.5% sodium sulphate in such a manner that the test sample was fully submerged, but the copper wire extended to the air. The exposed end of the wire was then connected to a rectifier so that it became an anode. A steel rod introduced into the filled 20 liter pail was connected to the rectifier as the cathode. The rectifier was adjusted to supply current at the rate of 0.25 amps, for which a voltage of 0.8V was required. As electrolysis continued bubble formation was observed only at the outer shell of the test cylinder.

Example 7

Laboratory Electrolysis of Low Calcium Cements in Combination with Semi-Permeable Coke Breeze.

The anodes are constructed in a cylindrical shape with a diameter of approximately 3-4" and a length of 4-5 feet. Embedded in the center of the anode is a conductive component that is bonded to an insulated conductor, which in turn is connected to the rectifier. In this application a 3½" i.d. thin wall PVC conduit is used to form the anode. The lead wire is connected to titanium mixed metal oxide mesh by means of an exothermic weld, and placed in the form. The form is then filled with the cementitious concrete described and allowed to cure in a moist environment. Once hardened the conduit is removed from the form and placed in position.

Example 8

Three Year Field Trial Utilizing a Gas-Permeable Anodic Sheath

A long term field trial utilizing the principles here disclosed commenced in January 2002 and continues. The results here presented reveal that when evaluated in January 2005, after three years of continuous operation the system continues to performing extremely well in comparison to a traditional cathodic protection system. There is moreover no evidence of a deleterious affects caused by gas formation. [Refer to example 7]

In preparation for this trial, two holes 10" in diameter were excavated to a depth of 366 feet. The first hole was used to prepare a "traditional" anodic bed, while the second hole was used for evaluation of the novel semi-permeable cementitious composition. The traditional bed was prepared by installing 20 graphite rods of 4" diameter and 80" long. After placement of these electrodes the void space was then backfilled with 5320 pounds of metallurgical coke breeze. In this trial, which did not involve the manufacture of a pre-cast sheath, the test bed was prepared by introducing 12 mixed metal oxide mesh anodes 1"×40" in size, followed by a water based slurry of 3850 pounds of one of the novel gas-permeable conductive compositions as backfill.

The specific composition of the conductive composition employed in this test utilized the composition described in Example 1, Table 1, Test #1. Sufficient backfill material to fill the hole was prepared by dry blending Type 10 Portland cement and Loresco Type SC-3 coke breeze in a cement mixer in the ratio of 70:30 parts by weight, with sufficient water (50 parts by weight per 100 parts of dry mix) so that the composition was converted to a paste of such consistency that it could be pumped into the cavity. After 3 weeks during which the cement was sufficiently cured, both the control and test beds were energized by means of an external direct current power source in which the electrodes in the test holes were anodic, while the cathode consisted of a steel pipe buried in the soil at a distance of 100 feet from the anodes.

In this trial the efficiency of the two systems may be determined by comparing the resistance of the two circuits, the lower the value the better. As shown in Table 6 below, the resistance of the traditional bed increased with time, while the novel composition declined. By year three the resistance of the novel composition as described in 0054 was about 24% lower than the control bed. Most importantly the test bed revealed no evidence of problems related to gas formation, which might have been manifest either visually or as exceptional fluctuations in current flow.

TABLE 6

| | Control bed (Coke Breeze) | | | Test Bed (Novel Composition) | | |
|---|---|---|---|---|---|---|
| Date | Volts | Amps | Ohms | Volts | Amps | Ohms |
| January 2002 | 16.40 | 16.90 | 0.97 | n/a (curing) | | |
| March 2002 | 25.20 | 22.40 | 1.13 | 25.40 | 12.00 | 2.12 |
| May 2002 | 25.00 | 21.10 | 1.18 | 25.40 | 12.30 | 2.07 |
| July 2002 | 25.14 | 21.45 | 1.17 | 25.60 | 12.00 | 2.13 |
| September 2002 | 25.26 | 21.00 | 1.20 | 25.49 | 11.55 | 2.21 |
| November 2002 | 25.20 | 20.85 | 1.21 | 25.56 | 11.70 | 2.18 |
| January 2003 | 16.30 | 12.45 | 1.31 | 16.62 | 7.05 | 2.36 |
| March 2003 | 16.26 | 12.30 | 1.32 | 16.71 | 7.05 | 2.37 |
| May 2003 | 16.37 | 12.30 | 1.33 | 16.77 | 6.90 | 2.43 |
| July 2003 | 8.13 | 1.05 | 7.74 | 17.14 | 9.90 | 1.73 |
| September 2003 | 16.63 | 12.15 | 1.37 | 16.83 | 7.05 | 2.39 |
| May 2004 | 33.91 | 21.45 | 1.58 | 25.72 | 21.00 | 1.22 |
| July 2004 | 34.23 | 21.20 | 1.61 | 25.69 | 20.85 | 1.23 |
| September 2004 | 33.55 | 21.60 | 1.55 | 25.37 | 20.40 | 1.24 |
| November 2004 | 33.75 | 22.20 | 1.52 | 25.30 | 20.55 | 1.23 |
| January 2005 | 33.80 | 21.15 | 1.60 | 25.52 | 20.10 | 1.27 |

As emphasized throughout the foregoing disclosure, the invention in its broadest terms is directed to controlling the relative permeability of groundwater and gases in a deep well anode system through the use of a conductive sheathing material of adjusted permeability for the anode or alternatively an impermeable conductive anode in conjunction and cooperation with a quasi-permeable, conductive backfill in the well bore. Those of skill in the art will appreciate that many materials might be used equivalently to achieve such control, beyond the formulations specifically exemplified above. It is intended that the appended claims cover all such equivalents.

We claim:

1. In a deep well grounding system of the kind including an anode lowered into a bore hole which is subsequently backfilled for cathodic protection, the improvement which comprises providing:
   (i) a metal conductive anode encased in a first conductive composition; and
   (ii) a backfill material consisting essentially of a second conductive composition,
   wherein the permeability of said first conductive composition and the permeability of said second conductive composition are such that said grounding system allows free venting of by-product gases generated during operation of the system, while limiting undesired migration of groundwater.

2. A deep well grounding system according to claim 1, wherein said first conductive composition comprises a siliceous cement and an electrically conductive form of carbon and exhibits a water permeability between $10^{-6}$ and $10^{-8}$ cm/sec.

3. A deep well grounding system according to claim 2, wherein said siliceous cement is Portland cement in a proportion of between 20 and 60% by weight and said carbon is of a particle size between 50 and 150 mesh in a proportion between 40% and 80% by weight.

4. A deep well grounding system according to claim 3, wherein said second conductive composition comprises a flowable granulated carbon admixed with a selected amount of Type F fly ash to adjust the water permeability of the backfill to between $10^{-6}$ and $10^{-8}$ cm/sec.

5. A deep well grounding system according to claim 3, wherein said carbon is coke breeze.

6. A deep well grounding system according to claim 2, wherein said second conductive composition comprises between 50 and 90% coke breeze and between 10 and 40% Type F fly ash.

7. A deep well grounding system according to claim 1, wherein each of said first and second conductive compositions independently comprises a siliceous cement and an electrically conductive form of carbon and exhibits a water permeability between $10^{-6}$ and $10^{-8}$ cm/sec.

8. A deep well grounding system according to claim 7, wherein said first composition or said second composition further comprises a minor amount of an additive for adjusting the water permeability of the composition, said additive being selected from the group consisting of alkali soaps of oleic acid, stearic acid or distilled tall oil and mixtures thereof.

9. A deep well grounding system according to claim 8, wherein said additive further comprises 1-10% of a di- or trivalent metal oxide or hydroxide cross-linking agent.

10. A deep well grounding system according to claim 1, wherein each of said first and second conductive compositions independently comprises a granular, electrically conductive form of carbon, from 3 to 6% by weight of CaO and a binder comprising distilled tall oil.

11. A deep well grounding system according to claim 1, wherein said first conductive composition is substantially impermeable to water and said second conductive composition comprises a siliceous cement and an electrically conductive form of carbon and exhibits a water permeability between $10^{-6}$ and $10^{-8}$ cm/sec.

12. A deep well grounding system according to claim 11, wherein said second composition further comprises a minor amount of an additive for adjusting the water permeability thereof, said additive being selected from the group consisting of alkali soaps of oleic acid, stearic acid or distilled tall oil and mixtures thereof.

13. An electrically conductive composition for use as a protective sheath for the ground anode or as the backfill material in a deep well grounding system, comprising from 20 to 60% by weight of Portland cement, from 40 to 80% by weight of particulate carbon, between 50 and 200 mesh and an additive for adjusting the water permeability of the composition to $10^{-6}$ and $10^{-8}$ cm/sec.

14. A composition according to claim 13, wherein said additive is selected from the group consisting of alkyl soaps of oleic acids, stearic acid or distilled tall oil and mixtures thereof.

15. A composition according to claim 14, wherein said particulate carbon is coke breeze.

* * * * *